United States Patent
Feltham

(10) Patent No.: US 9,895,953 B2
(45) Date of Patent: Feb. 20, 2018

(54) VEHICLE HEAT EXCHANGER AIR FLOW CONTROL SYSTEM

(71) Applicant: Atieva, Inc., Menlo Park, CA (US)

(72) Inventor: Graham Lloyd Feltham, Menlo Park, CA (US)

(73) Assignee: ATIEVA, INC., Menlo Park, CA (US)

( * ) Notice: Subject to any disclaimer, the term of this patent is extended or adjusted under 35 U.S.C. 154(b) by 146 days.

(21) Appl. No.: 14/971,064

(22) Filed: Dec. 16, 2015

(65) Prior Publication Data

US 2017/0174040 A1    Jun. 22, 2017

(51) Int. Cl.
*B60H 1/00* (2006.01)
*B60H 1/14* (2006.01)

(52) U.S. Cl.
CPC ..... *B60H 1/00385* (2013.01); *B60H 1/00021* (2013.01); *B60H 1/143* (2013.01); *B60H 2001/00085* (2013.01)

(58) Field of Classification Search
CPC .......... B60H 1/00278; B60H 1/22; B60H 2001/00307; B60H 1/00899; B60H 2001/00928; B60H 2001/003

USPC .......... 165/41–44, 98; 454/69, 143
See application file for complete search history.

(56) References Cited

U.S. PATENT DOCUMENTS

2011/0094257 A1\* 4/2011 Rusignuolo ........... F28D 1/0443
                                                              62/498
2012/0168125 A1\* 7/2012 Johnston ................ F28F 27/02
                                                              165/96

\* cited by examiner

*Primary Examiner* — Steven B McAllister
*Assistant Examiner* — Ko-Wei Lin
(74) *Attorney, Agent, or Firm* — Patent Law Office of David G. Beck

(57) ABSTRACT

A heat exchanger air control system is provided that utilizes a central heat exchanger and a pair of side-mounted heat exchangers, where the central heat exchanger is positioned forward of the side-mounted heat exchangers. The air outlet of the central heat exchanger is coupled to both the air inlet and the air outlet of each of the side-mounted heat exchangers using several air ducts through which air flow is controlled, thus allowing air flow throughout the system to be optimized based on the needs of the thermal systems coupled to the heat exchangers. A pair of fans, one adjacent to the outlet of each of the side-mounted heat exchangers, can be used to draw air through various combinations of the three heat exchangers.

17 Claims, 10 Drawing Sheets

VEHICLE HEAT EXCHANGER AIR FLOW CONTROL SYSTEM

FIELD OF THE INVENTION

The present invention relates generally to vehicles and, more particularly, to a vehicle radiator and condenser airflow system.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

In order to achieve the desired levels of performance and reliability in an electric vehicle, it is critical that the temperatures of the battery pack, power electronics, traction motor and related drive train components each remain within their respective operating temperature ranges regardless of ambient conditions or how hard the vehicle is being driven. Furthermore, in addition to controlling battery and drive train temperatures, the thermal management system must also be capable of heating and cooling the passenger cabin while not unduly affecting the vehicle's overall operating efficiency. In the past, thermal management systems have been configured in a variety of ways in order to meet these design goals. Regardless of the configuration, however, common to each of these approaches is the reliance on at least one, and typically more than one, heat exchanger.

Heat exchangers are designed to transfer heat between two similar or dissimilar fluids, where the fluids may be comprised of water or water with an additive, refrigerant, air, oil or other fluid. The performance associated with such a heat exchanger is based on a variety of factors including (i) the flow rate associated with each of the fluids through the heat exchanger, (ii) the surface area allotted for heat transfer between the two fluids, (iii) the thermal characteristics of the two fluids, and (iv) the temperature difference between the two fluids.

While not required, in a typical vehicle's thermal management system multiple heat exchangers are stacked together, i.e., positioned one in front of the other. A fan, either located in front or behind the stack, may be used to augment air flow through the stack, assuming that air is one of the fluids used by the heat exchanger(s). However while heat exchanger stacking is quite common, given the increased hydraulic losses in such an arrangement (e.g., fan power, aerodynamic drag, etc.) as well as the decrease in thermal efficiency and performance, it is not a preferred configuration when efficiency is a key design goal, such as in an electric vehicle.

U.S. Patent Publication 2012/0168125 discloses a thermal management system in which multiple heat exchangers are used in a non-stacking arrangement. Using multiple sets of louvers, the disclosed system allows air to be channeled in several different configurations, including (i) bypassing all heat exchangers, (ii) passing only through the side-mounted heat exchangers, (iii) serially passing through the central heat exchanger and then the side-mounted heat exchangers, or (iv) passing a portion of the intake air only through the side-mounted heat exchangers and a second portion of the intake air serially through the central heat exchanger and then the side-mounted heat exchangers. U.S. Patent Publication 2012/0168125 also discloses locating fans behind the side-mounted heat exchangers in order to augment air flow.

Although the prior art discloses numerous techniques for mounting and configuring the heat exchangers in a vehicle's thermal management system, an improved configuration is needed that allows the efficiencies associated with a non-stacking heat exchanger arrangement to be achieved while still providing a system that allows individual air flow control for each of the heat exchangers. The present invention provides such a heat exchanger configuration and control system.

SUMMARY OF THE INVENTION

The present invention provides an air flow control system for use with three non-stacked heat exchangers, the system comprising: (i) a first air inlet that corresponds to the first heat exchanger, where air flowing into the first air inlet passes directly into the first heat exchanger without passing through either the second or third heat exchangers; (ii) a second air inlet that corresponds to the second heat exchanger, where air flowing into the second air inlet passes directly into the second heat exchanger without passing through either the first or third heat exchangers; (iii) a third air inlet that corresponds to the third heat exchanger, where air flowing into the third air inlet passes directly into the third heat exchanger without passing through either the first or second heat exchangers; (iv) a first air duct that couples the first air outlet corresponding to the first heat exchanger to the second air inlet corresponding to the second heat exchanger; (v) a second air duct that couples the first air outlet corresponding to the first heat exchanger to the third air inlet corresponding to the third heat exchanger; (vi) a third air duct that couples the first air outlet corresponding to the first heat exchanger to the second air outlet corresponding to the second heat exchanger; and (vii) a fourth air duct that couples the first air outlet corresponding to the first heat exchanger to the third air outlet corresponding to the third heat exchanger.

In one aspect, the system may further include a first fan positioned adjacent to the second air outlet and configured to: (i) draw air through the second heat exchanger via a first pathway, where air following the first pathway passes through the second air inlet, the second heat exchanger, and through the second air outlet; (ii) draw air through the second heat exchanger via a second pathway, where air following the second pathway passes through the first air inlet, the first heat exchanger, the first air duct, the second heat exchanger, and through the second air outlet; and (iii) draw air around the second heat exchanger and bypass the second heat exchanger via a third pathway, where air following the third pathway passes through the first air inlet, the first heat exchanger, the third air duct, and through the second air outlet. The system may further include a second fan positioned adjacent to the third air outlet and configured to: (i) draw air through the third heat exchanger via a fourth pathway, where air following the fourth pathway passes through the third air inlet, the third heat exchanger, and through the third air outlet; (ii) draw air through the third heat exchanger via a fifth pathway, where air following the fifth pathway passes through the first air inlet, the first heat exchanger, the second air duct, the third heat exchanger, and through the third air outlet; and (iii) draw air around the third heat exchanger and bypass the third heat exchanger via a sixth pathway, where air following the sixth pathway passes through the first air inlet, the first heat exchanger, the fourth air duct, and through the third air outlet.

In another aspect, the system may further include a first air control surface incorporated into the first air duct and a second air control surface incorporated into the second air duct. The first air control surface is adjustable between a first air control surface closed position and a first air control surface open position, where air flowing through the first heat exchanger flows through the first air duct and into the second heat exchanger via the second air inlet when the first air control surface is in the first air control surface open position, and where air flow between the first air outlet and the second air inlet is terminated when the first air control surface is in the first air control surface closed position. Preferably the first air control surface is adjustable over a first range of positions between and including the first air control surface open and closed positions. The second air control surface is adjustable between a second air control surface closed position and a second air control surface open position, where air flowing through the first heat exchanger flows through the second air duct and into the third heat exchanger via the third air inlet when the second air control surface is in the second air control surface open position, and where air flow between the first air outlet and the third air inlet is terminated when the second air control surface is in the second air control surface closed position. Preferably the second air control surface is adjustable over a second range of positions between and including the second air control surface open and closed positions.

In another aspect, the system may further include a third air control surface incorporated into the third air duct and a fourth air control surface incorporated into the fourth air duct. The third air control surface is adjustable between a third air control surface closed position and a third air control surface open position, where air flowing through the first heat exchanger flows through the third air duct and through the second air outlet and bypasses the second heat exchanger when the third air control surface is in the third air control surface open position, and where air flow between the first air outlet and the second air outlet is terminated when the third air control surface is in the third air control surface closed position. Preferably the third air control surface is adjustable over a third range of positions between and including the third air control surface open and closed positions. The fourth air control surface is adjustable between a fourth air control surface closed position and a fourth air control surface open position, where air flowing through the first heat exchanger flows through the fourth air duct and through the third air outlet and bypasses the third heat exchanger when the fourth air control surface is in the fourth air control surface open position, and wherein air flow between the first air outlet and the third air outlet is terminated when the fourth air control surface is in the fourth air control surface closed position. Preferably the fourth air control surface is adjustable over a fourth range of positions between and including the fourth air control surface open and closed positions. The third air duct may be coupled to the first air duct at a first juncture and the third air control surface may be integrated into the first juncture. The fourth air duct may be coupled to the second air duct at a second juncture and the fourth air control surface may be integrated into the second juncture.

In another aspect, the system may further include a fifth air control surface integrated into the second air inlet and a sixth air control surface integrated into the third air inlet. The fifth air control surface is adjustable between a fifth air control surface closed position and a fifth air control surface open position, such that air is permitted to flow into the second heat exchanger via the second air inlet when the fifth air control surface is in the fifth air control surface open position, and air is not permitted to flow into the second heat exchanger via the second air inlet when the fifth air control surface is in the fifth air control surface closed position. Preferably the fifth air control surface is adjustable over a fifth range of positions between and including the fifth air control surface open and closed positions. The sixth air control surface is adjustable between a sixth air control surface closed position and a sixth air control surface open position, such that air is permitted to flow into the third heat exchanger via the third air inlet when the sixth air control surface is in the sixth air control surface open position, and air is not permitted to flow into the third heat exchanger via the third air inlet when the sixth air control surface is in the sixth air control surface closed position. Preferably the sixth air control surface is adjustable over a sixth range of positions between and including the sixth air control surface open and closed positions.

In another aspect, the first heat exchanger may be comprised of a pair of side-by-side heat exchangers. The first air inlet corresponding to the first heat exchanger may be comprised of a pair of side-by-side air inlets that correspond to the pair of side-by-side heat exchangers.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, steps, operations, elements, and/or components, but do not preclude the presence or addition of one or more other features, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system. The terms "thermal control circuit" and "thermal control loop" may be used interchangeably.

Figure 1:
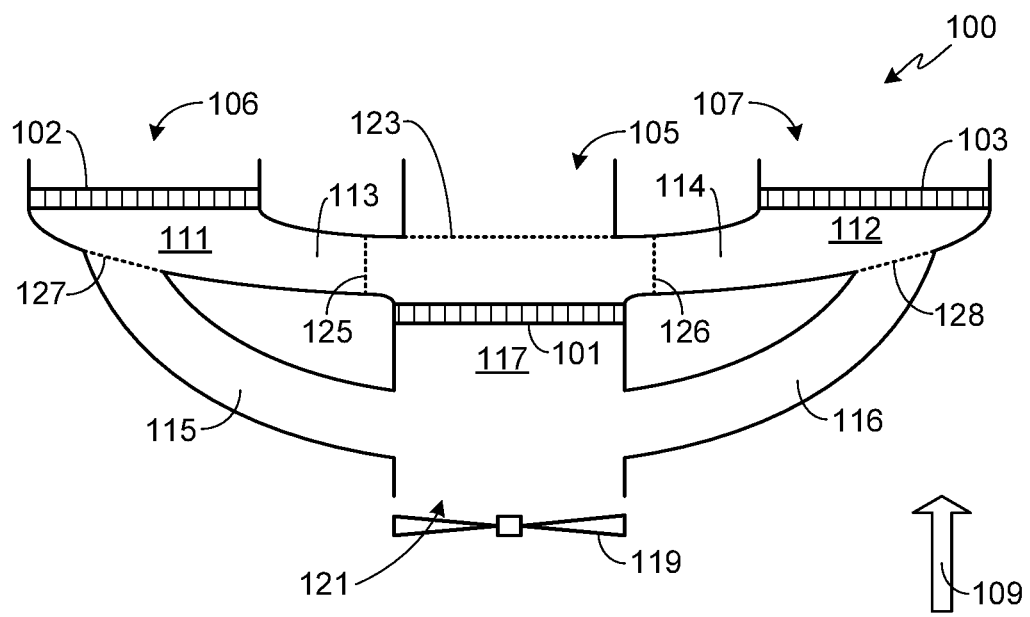
FIG. 1 provides a schematic illustration of a preferred embodiment of the heat exchanger air flow control system of the invention.

FIG. 1 provides a schematic illustration of a preferred embodiment of a heat exchanger air control system 100 in accordance with the invention. System 100 includes a central heat exchanger 101 and a pair of side-mounted heat exchangers 102 and 103, where the side-mounted heat exchangers 102/103 are positioned forward of the central heat exchanger 101. While the approach used in system 100 may be used with a single side-mounted heat exchanger, in a vehicle there are numerous advantages to using a symmetrical approach. It will be understood that heat exchangers 101-103, as well as the heat exchangers described relative to the other configurations of the invention, may be coupled to any of a variety of vehicle components associated with the vehicle's thermal management system (e.g., refrigeration system, passenger HVAC system, drive train components, battery pack, power electronics, etc.). Similarly, the heat exchangers of the invention are not limited to use with a specific thermal management system configuration.

In system 100 there are three air inlets 105-107 associated with heat exchangers 101-103, respectively. When the car moves forward in a direction 109, air is directed into each of these air inlets. The outlet from each of the side-mounted heat exchangers, i.e., outlet 111 corresponding to heat exchanger 102 and outlet 112 corresponding to heat exchanger 103, is split into two outlet ducts. One of the two outlet ducts associated with each side-mounted heat exchanger, i.e., duct 113 associated with outlet 111 and duct 114 associated with outlet 112, are coupled to central intake 105. As such, air passing through one or both of the side-mounted heat exchangers and flowing through one or both of the air ducts 111/112 will be directed into the intake of heat exchanger 101. The second of the two outlet ducts associated with each side-mounted heat exchanger, i.e., duct 115 associated with outlet 111 and duct 116 associated with outlet 112, are coupled to the central outlet duct 117. Preferably a single fan 119 is located at the outlet of central duct 117. It will be appreciated that fan 119 may augment air flow through any or all of the heat exchangers, depending upon the settings associated with the various duct flaps described below.

In order to provide air flow control throughout heat exchanger system 100, multiple flaps are incorporated throughout the air duct system. Each of these flaps may be fabricated as a single flap, or door, that can be varied between a fully open position that provides minimal air flow restriction through the corresponding air duct, and a fully closed position that substantially eliminates air flow through the corresponding air duct. Alternately, these flaps may be fabricated to incorporate a plurality of smaller flaps, or vanes, which can be varied between the fully open and fully closed positions. It should be understood that the terms "flap", "vane", "air vane", "air control surface", "louver" and "door" may be used interchangeably and as used herein refer to one or more air control surfaces incorporated into an air duct and which may be rotated, or whose position may be otherwise altered, in order to vary the flow of air through the corresponding air duct between an open position in which air flow is minimally affected to a closed position in which air flow is substantially terminated. Preferably the air duct flaps are adjustable within a range of positions between and including the open and closed positions.

In system 100, five flaps are incorporated into the air ducts, thereby allowing complete control over the five air flow pathways associated with this configuration. A central flap 123 is incorporated into central air inlet 105, flap 123 controlling air flow passing directly into central heat exchanger 101. Flaps 125 and 126 are incorporated into air ducts 113 and 114, respectively, and control the air that flows first through a side-mounted heat exchanger (e.g., exchangers 102 and 103) and then through the central heat exchanger 101. Flaps 127 and 128, incorporated into air ducts 115 and 116, respectively, permit air to flow only through a side-mounted heat exchanger before being exhausted via central outlet duct 117.

Figure 2:
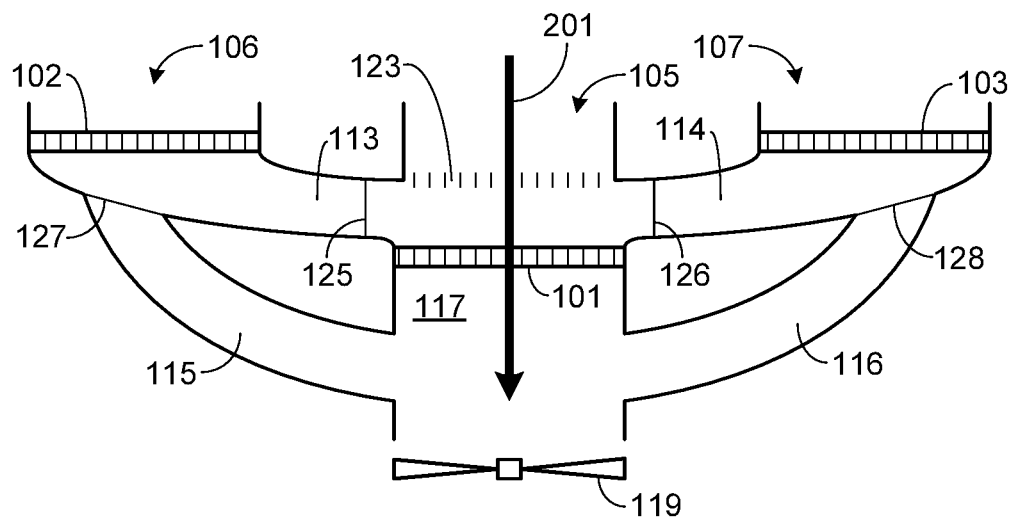
FIG. 2 provides an illustration of the embodiment shown in FIG. 1 with the air duct flaps set such that air flows directly through the central heat exchanger and does not flow through either side-mounted heat exchanger.

FIGS. 2-8 illustrate seven different air duct control flap set-ups for system 100, these views showing a variety of exemplary air flow configurations. As flaps 123, 125/126, and 127/128 are preferably independently operable, it will be appreciated that FIGS. 2-8 only illustrate some of the possible air flow patterns. For example, due to independent flap control, one of the side-mounted heat exchangers could be active while the other side-mounted heat exchanger is not. Briefly, FIGS. 2-8 illustrate the following air flow patterns:

In FIG. 2, flap 123 is open and flaps 125, 126, 127 and 128 are closed. As such, air follows pathway 201 and passes only through inlet 105 and the central heat exchanger 101 before being expelled through outlet air duct 117.

Figure 3:
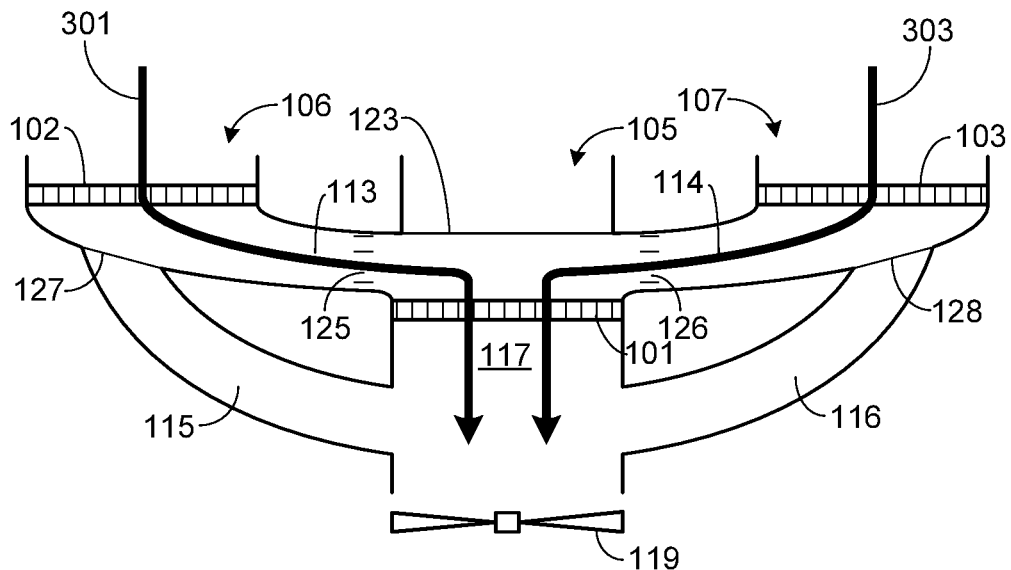
FIG. 3 provides an illustration of the embodiment shown in FIG. 1 with the air duct flaps set such that air flows directly through both side-mounted heat exchangers and indirectly through the central heat exchanger.

In FIG. 3, flaps 125 and 126 are open and flaps 123, 127 and 128 are closed. As such, air following pathway 301 passes through inlet 106, side-mounted heat exchanger 102, and then through central heat exchanger 101 before being expelled through outlet air duct 117. Similarly, air following pathway 303 passes through inlet 107, side-mounted heat exchanger 103, and then through central heat exchanger 101 before being expelled through outlet air duct 117.

Figure 4:
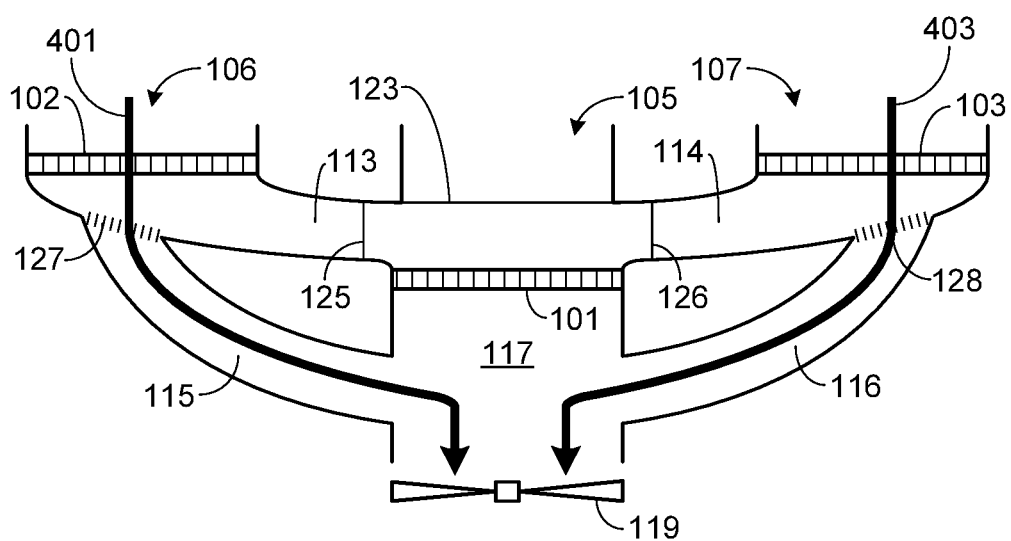
FIG. 4 provides an illustration of the embodiment shown in FIG. 1 with the air duct flaps set such that air flows directly through both side-mounted heat exchangers and bypasses the central heat exchanger.

In FIG. 4, flaps 127 and 128 are open and flaps 123, 125 and 126 are closed. As such, air follows pathway 401 through inlet 106 and then through side-mounted heat exchanger 102 before being expelled through outlet air duct 117. Similarly, air follows pathway 403 through inlet 107 and then through side-mounted heat exchanger 103 before being expelled through outlet air duct 117. In this flap configuration there is no air flow through central heat exchanger 101.

Figure 5:
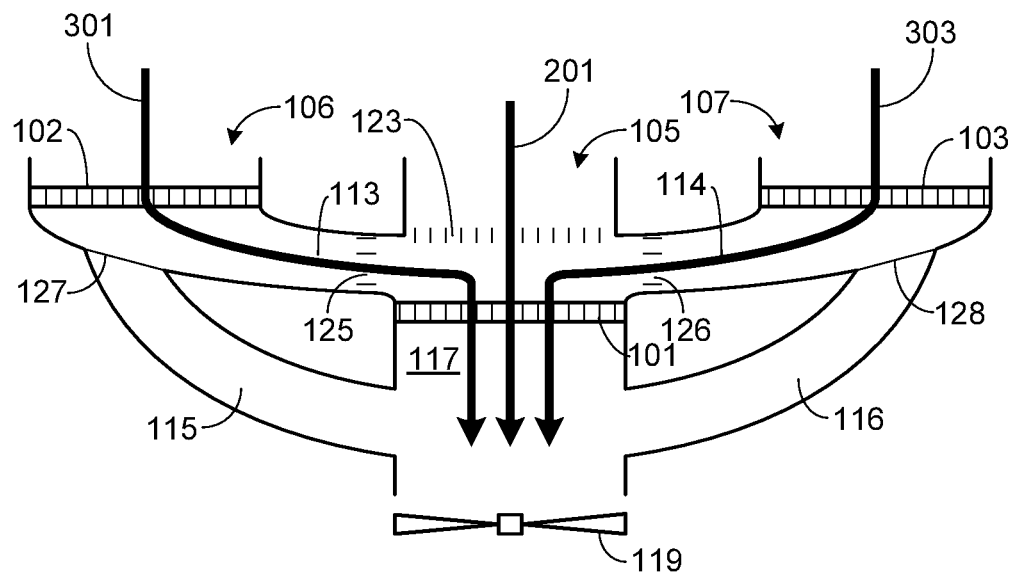
FIG. 5 provides an illustration of the embodiment shown in FIG. 1 with the air duct flaps set such that air flows directly through both side-mounted heat exchangers and both directly and indirectly through the central heat exchanger.

In FIG. 5, flaps 123, 125 and 126 are open and flaps 127 and 128 are closed. As such, air flows into and through the heat exchangers following three pathways, i.e., pathways 201, 301 and 303. Therefore in this configuration air flows through central heat exchanger 101 both directly via inlet 105, and indirectly via inlets 106/107 and side-mounted heat exchangers 102/103.

Figure 6:
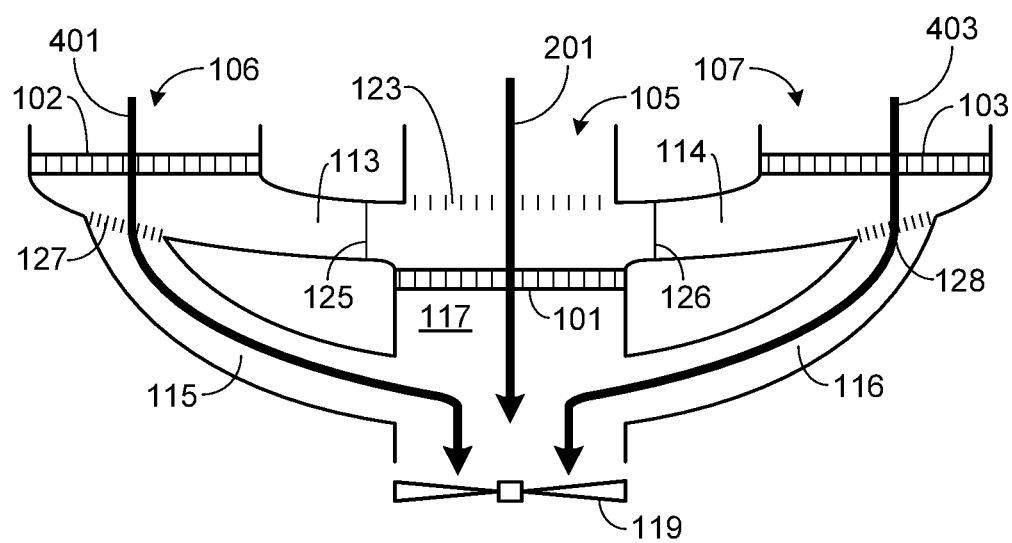
FIG. 6 provides an illustration of the embodiment shown in FIG. 1 with the air duct flaps set such that air flows directly through both side-mounted heat exchangers as well as the central heat exchanger.

In FIG. 6, flaps 123, 127 and 128 are open and flaps 125 and 126 are closed. As such, air flows into and through the heat exchangers following three pathways, i.e., pathways 201, 401 and 403. Therefore in this configuration air flows through central heat exchanger 101 only directly through inlet 105 since the air passing through the side-mounted heat exchangers bypasses the central heat exchanger, instead flowing out through outlet air duct 117 via air ducts 115 and 116.

Figure 7:
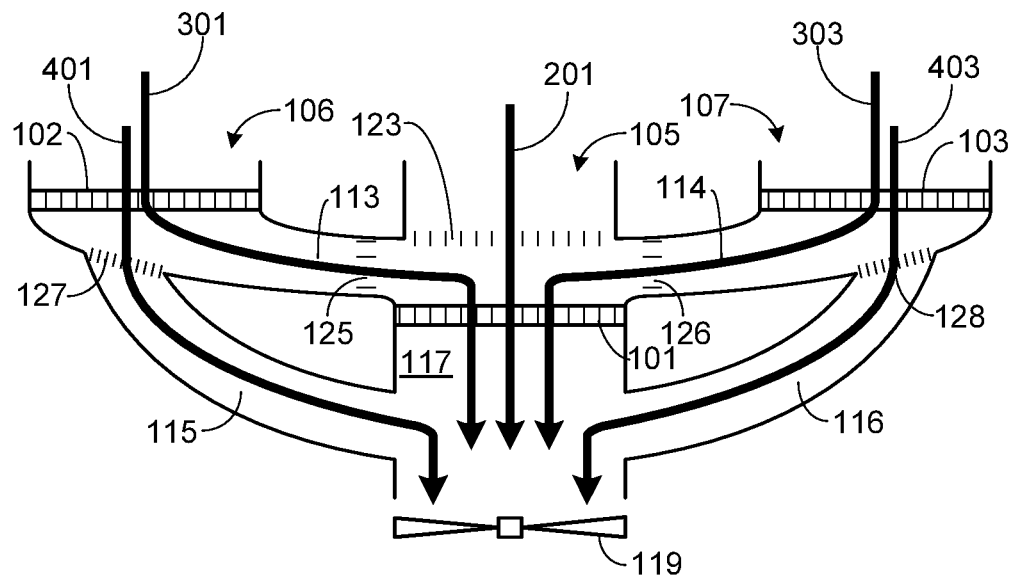
FIG. 7 provides an illustration of the embodiment shown in FIG. 1 with the air duct flaps set such that air flows directly through both side-mounted heat exchangers and both directly and indirectly through the central heat exchanger.

In FIG. 7, all flaps are open and as such, air flows into and through the heat exchangers following five pathways, i.e., pathways 201, 301, 303, 401 and 403.

Figure 8:
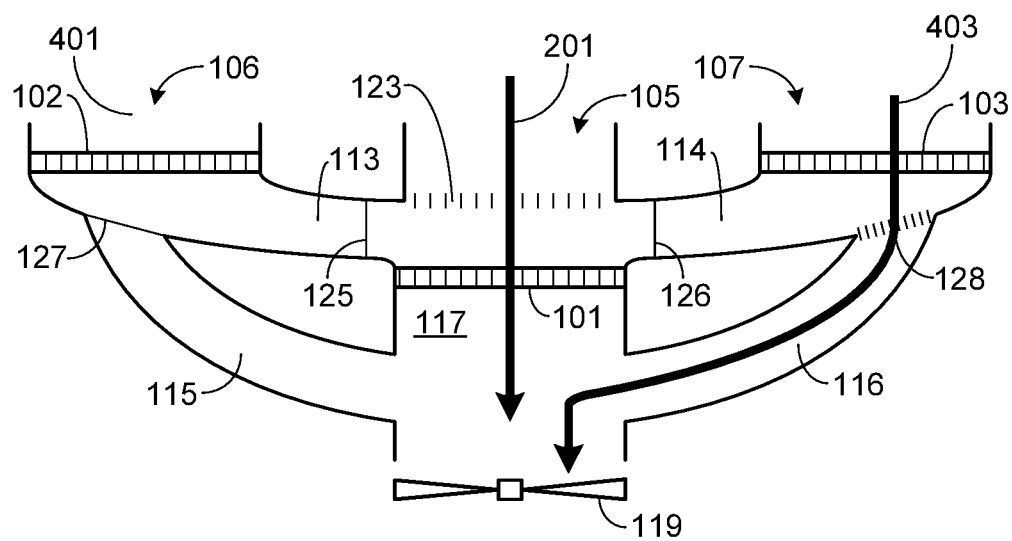
FIG. 8 provides an illustration of the embodiment shown in FIG. 1 with the air duct flaps set such that air flows directly through the central heat exchanger and one of the side-mounted heat exchangers.

FIG. 8 illustrates a configuration in which only one of the side-mounted heat exchangers is in use. As shown, flaps 123 and 128 are open and flaps 125, 126 and 127 are closed. As a result of this configuration, air flows directly through central heat exchanger 101 via air inlet 105 (i.e., pathway 201) and directly through side-mounted heat exchanger 103 via air inlet 107 (i.e., pathway 403). Since flaps 125 and 126 are closed, air does not flow indirectly through the central heat exchanger 101. Additionally since flaps 125 and 127 are closed, air does not flow through side-mounted heat exchanger 102.

Figure 9:
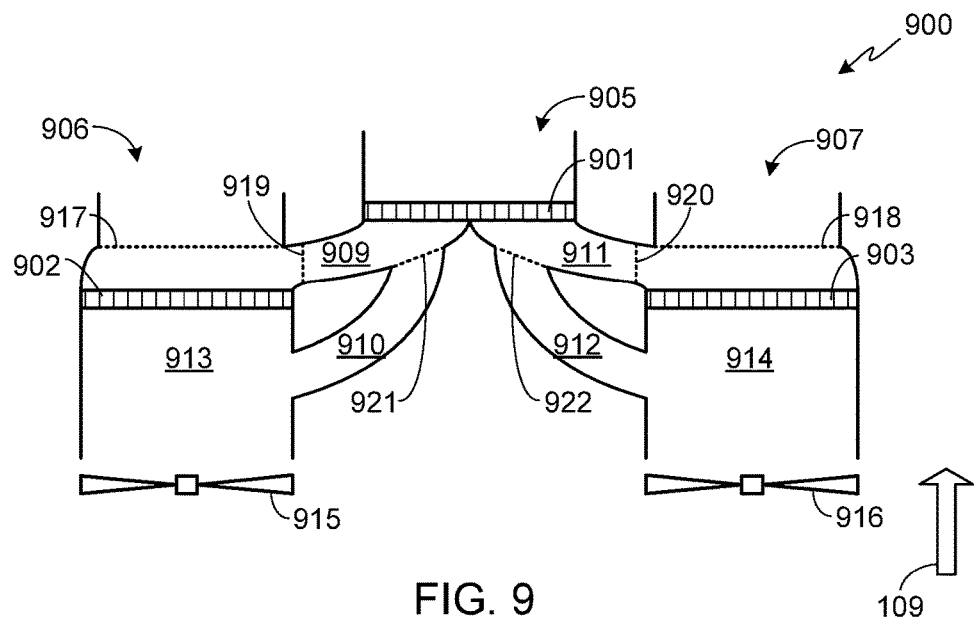
FIG. 9 provides a schematic illustration of an alternate heat exchanger air flow control system in accordance with the invention.

FIG. 9 provides a schematic illustration of a second preferred embodiment of the invention. In system 900, the central heat exchanger 901 is mounted forward of the side-mounted heat exchangers 902 and 903. As in the prior embodiment, associated with each heat exchanger is an air inlet, i.e., inlets 905-907 correspond to heat exchangers 901-903, respectively. The outlet from the central heat exchanger 901 is split into four ducts 909-912, with two of the air ducts (i.e., ducts 909 and 910) associated with side-mounted heat exchanger 902 and two of the air ducts (i.e., ducts 911 and 912) associated with side-mounted heat exchanger 903. One of each pair of ducts couples the output of the central heat exchanger to the inlet of one of the side-mounted heat exchangers. Accordingly, air duct 909 couples the output of central heat exchanger 901 to inlet 906 of heat exchanger 902 and air duct 911 couples the output of central heat exchanger 901 to inlet 907 of heat exchanger 903. The second duct of each pair of ducts couples the output of the central heat exchanger to the outlet of one of the side-mounted heat exchangers, thereby bypassing the associated side-mounted heat exchanger. Accordingly, air duct 910 couples the output of central heat exchanger 901 to outlet 913 of heat exchanger 902 and air duct 912 couples the output of central heat exchanger 901 to outlet 914 of heat exchanger 903. Preferably a pair of fans 915/916 is used to augment air flow through the heat exchangers. As shown in FIG. 9, depending upon the duct flap settings, fan 915 may be used to augment air flow through either, or both, heat exchangers 901 and 902 while fan 916 may be used to augment air flow through either, or both, heat exchangers 901 and 903.

In order to provide air flow control in heat exchanger system 900, three sets of flaps are incorporated throughout the air duct system. Preferably the flaps incorporated into system 900, as are those incorporated into system 100, are independently operable, thus maximizing thermal management system flexibility. Each of these flaps may be fabricated as a single flap, or door, or a plurality of smaller flaps, or vanes, that can be varied between a fully open position that provides minimal air flow restriction through the corresponding air duct, and a fully closed position that substantially eliminates air flow through the corresponding air duct.

In system 900, six flaps are incorporated into the air ducts, thereby allowing complete control over the six air flow pathways associated with this configuration. Flaps 917 and 918 are incorporated into the air inlets associated with side-mounted heat exchangers 902 and 903, respectively, and control the flow of air entering directly into the side-mounted heat exchangers. A second set of flaps 919 and 920 are incorporated into ducts 909 and 911, respectively, and control the flow of air entering the air inlets of the side-mounted heat exchangers from the outlet of the central heat exchanger. A third set of flaps 921 and 922 are incorporated into ducts 910 and 912, respectively, and control the flow of air entering the air outlets of the side-mounted heat exchangers from the outlet of the central heat exchanger, thus bypassing the side-mounted heat exchangers.

Figure 10:
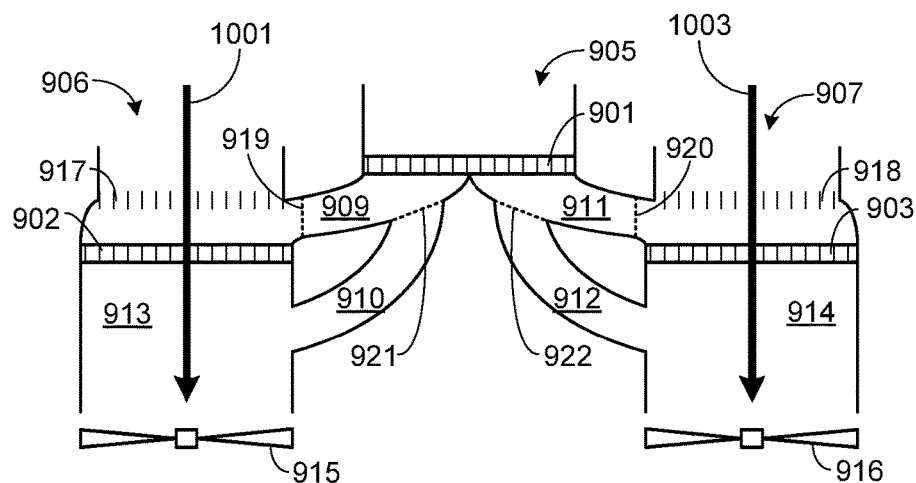
FIG. 10 provides an illustration of the embodiment shown in FIG. 9 with the air duct flaps set such that air flows directly through both side-mounted heat exchangers and does not flow through the central heat exchanger.
Figure 11:
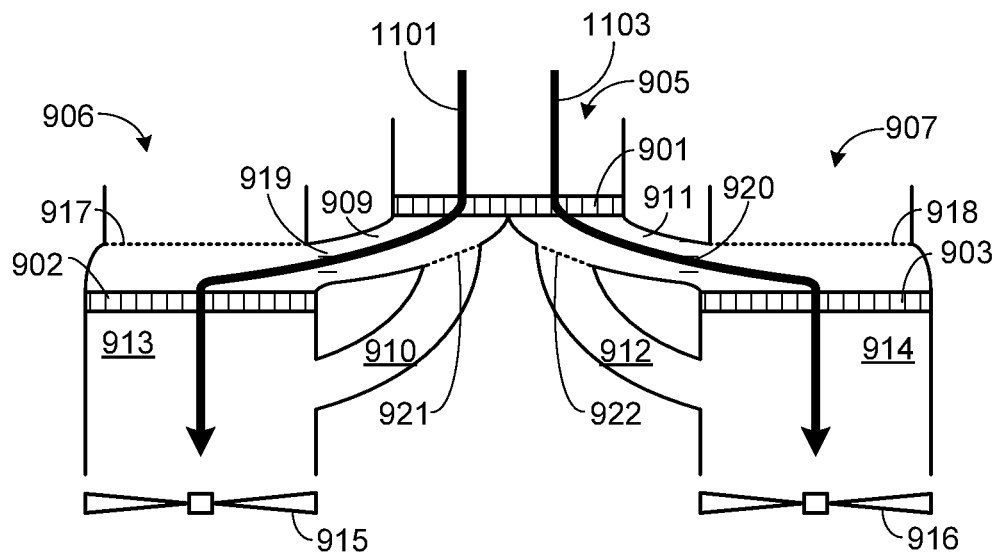
FIG. 11 provides an illustration of the embodiment shown in FIG. 9 with the air duct flaps set such that air flows directly through the central heat exchanger and then through both side-mounted heat exchangers.
Figure 12:
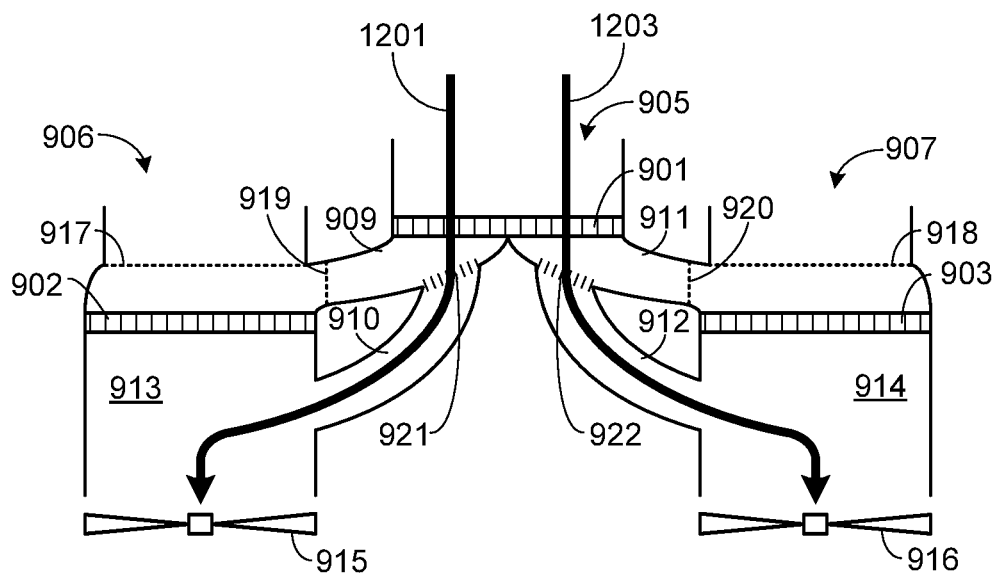
FIG. 12 provides an illustration of the embodiment shown in FIG. 9 with the air duct flaps set such that air flows directly through the central heat exchanger and then through air outlets, bypassing both side-mounted heat exchangers.
Figure 13:
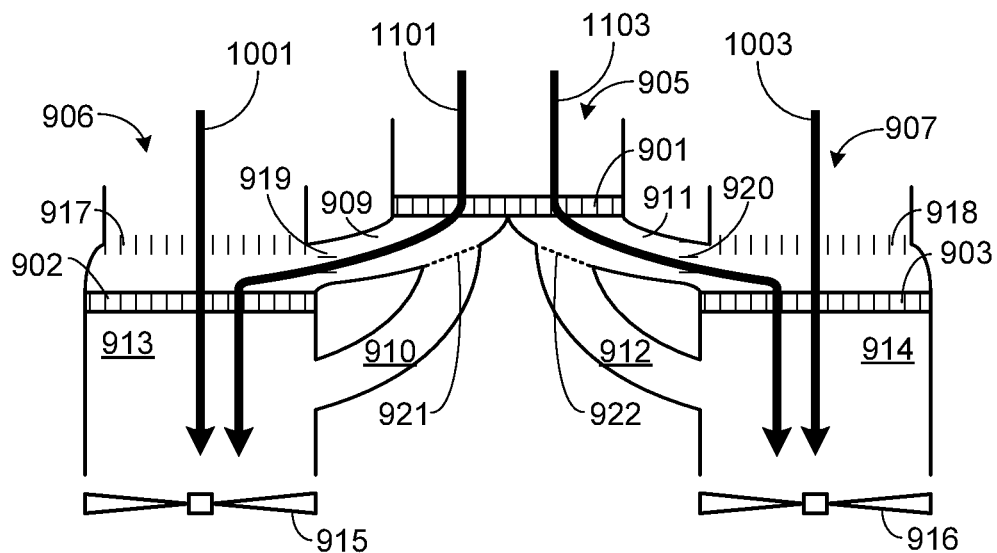
FIG. 13 provides an illustration of the embodiment shown in FIG. 9 with the air duct flaps set such that air flows directly through all three heat exchangers as well as indirectly through both side-mounted heat exchangers after passing through the central heat exchanger.
Figure 14:
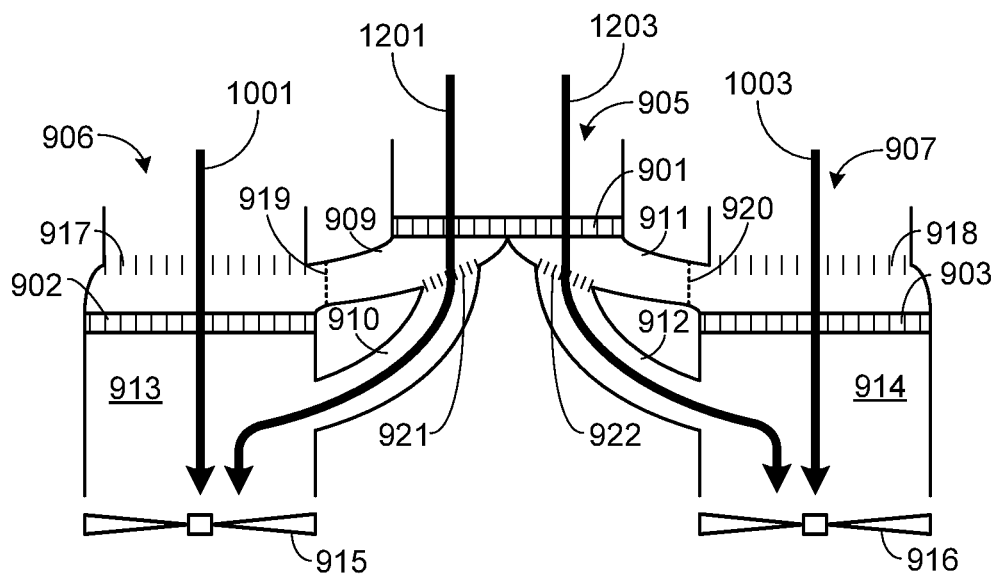
FIG. 14 provides an illustration of the embodiment shown in FIG. 9 with the air duct flaps set such that air only flows directly through the three heat exchangers.
Figure 15:
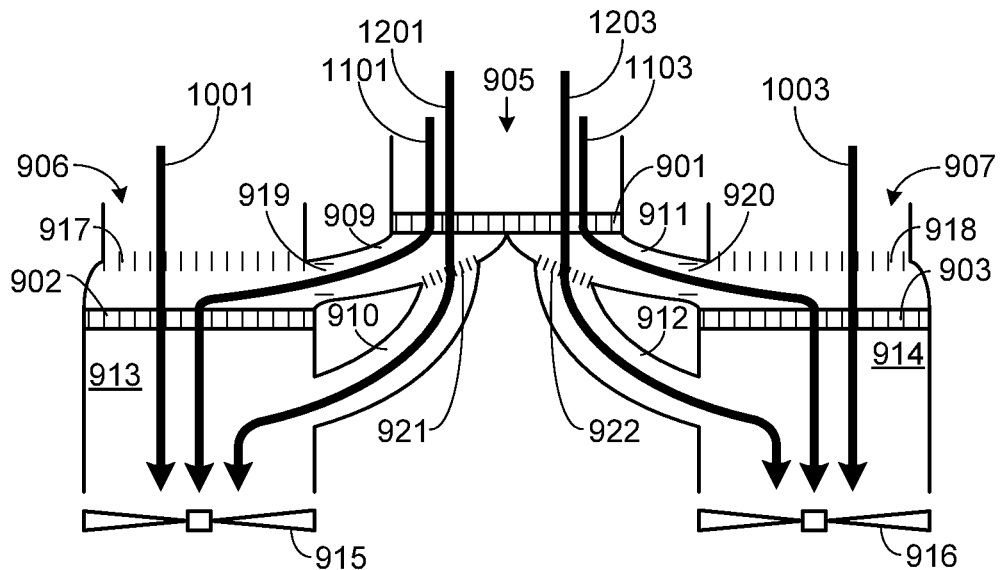
FIG. 15 provides an illustration of the embodiment shown in FIG. 9 with all of the air duct flaps open, thus allowing air to flow through all three air inlets and follow all six possible air flow pathways.
Figure 16:
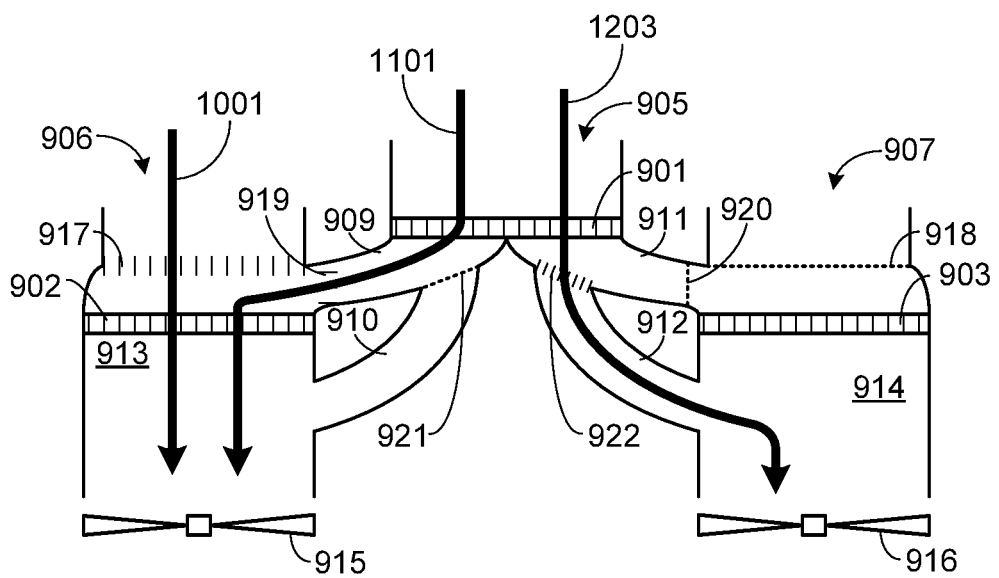
FIG. 16 provides an illustration of the embodiment shown in FIG. 9 with the air duct flaps set such that air flows through the central heat exchanger and one of the side-mounted heat exchangers.

FIGS. 10-16 illustrate seven different air duct control flap set-ups for system 900, these views showing a variety of exemplary air flow configurations. It should be understood that FIGS. 10-16 only illustrate some of the possible air flow patterns through the heat exchangers of system 900, and other configurations are clearly possible using flaps 917-922. Briefly, FIGS. 10-16 illustrate the following air flow patterns:

- In FIG. 10, flaps 917 and 918 are open and flaps 919-922 are closed. As such, air follows pathway 1001 and passes through inlet 906 and side-mounted heat exchanger 902 before being expelled through outlet air duct 913. Similarly, air follows pathway 1003 and passes through inlet 907 and side-mounted heat exchanger 903 before being expelled through outlet air duct 914.
- In FIG. 11, flaps 919 and 920 are open and flaps 917, 918, 921 and 922 are closed. As such, air follows pathway 1101 through inlet 905, through central heat exchanger 901, and then through side-mounted heat exchanger 902 before being expelled through outlet air duct 913. Similarly, air follows pathway 1103 through inlet 905, through central heat exchanger 901, and then through side-mounted heat exchanger 903 before being expelled through outlet air duct 914.
- In FIG. 12, flaps 921 and 922 are open and flaps 917-920 are closed. As such, air follows pathway 1201 through inlet 905, central heat exchanger 901 and then through outlet air duct 913, bypassing side-mounted heat exchanger 902. Similarly, air follows pathway 1203 through inlet 905, central heat exchanger 901 and then through outlet air duct 914, bypassing side-mounted heat exchanger 903.
- In FIG. 13, flaps 917-920 are open and flaps 921 and 922 are closed. As such, air follows pathways 1001, 1003, 1101 and 1103 and flows directly into all three heat exchangers and indirectly through the side-mounted heat exchangers after passing through central heat exchanger 901.
- In FIG. 14, flaps 917, 918, 921 and 922 are open and flaps 919 and 920 are closed. As such, air follows pathways 1001, 1003, 1201 and 1203 and flows directly into all three heat exchangers. In this configuration there is not indirect air flow through the side-mounted heat exchangers.
- In FIG. 15, all flaps are open and as such, air flows into and through the heat exchangers following six pathways, i.e., pathways 1001, 1003, 1101, 1103, 1201 and 1203.
- In FIG. 16, flaps 917, 919 and 922 are open and flaps 918, 920 and 921 are closed. As such, air flows directly through side-mounted heat exchanger 902 following pathway 1001 and through central heat exchanger 901 following pathways 1101 and 1203. The air flowing through the central heat exchanger passes through side-mounted heat exchanger 902 and through air outlet 914, thereby bypassing side-mounted heat exchanger 903.

Figure 17:
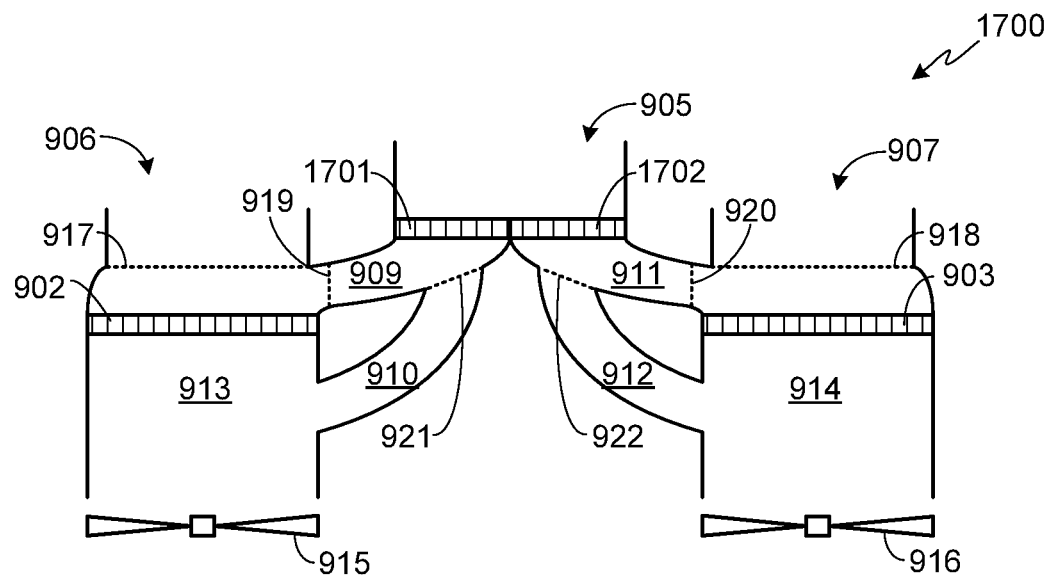
FIG. 17 provides a schematic illustration of a modification of the heat exchanger air flow control system shown in FIG. 9, the modified system replacing the central heat exchanger with a pair of side-by-side mounted heat exchangers.
Figure 18:
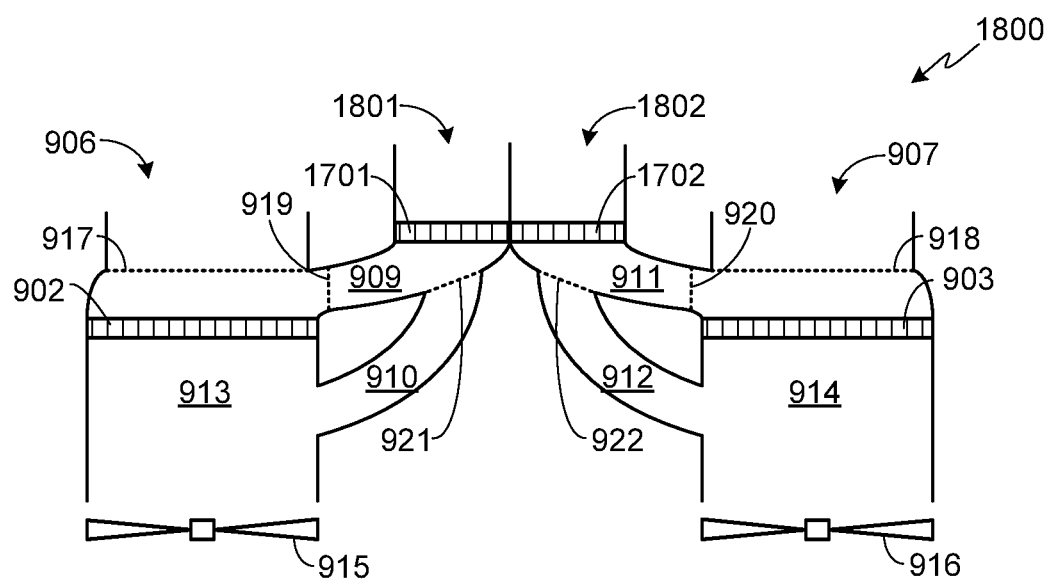
FIG. 18 provides a schematic illustration of a modification of the heat exchanger air flow control system shown in FIG. 9, the modified system replacing the central heat exchanger with a pair of side-by-side mounted heat exchangers and the central air duct with a pair of side-by-side air ducts.

FIG. 17 provides a schematic illustration of a modification of the embodiment shown in FIGS. 9-16. In system 1700, central heat exchanger 901 is replaced by a pair of side-by-side heat exchangers 1701 and 1702. In a further modification of system 900 shown in FIG. 18, in addition to replacing central heat exchanger 901 by a pair of side-by-side heat exchangers 1701/1702, central air duct 905 is replaced by a pair of side-by-side, centrally located, air ducts 1801 and 1802 that correspond to heat exchangers 1701 and 1702, thereby allowing separation of the air flow pathways on the left and right side of the vehicle.

Figure 19:
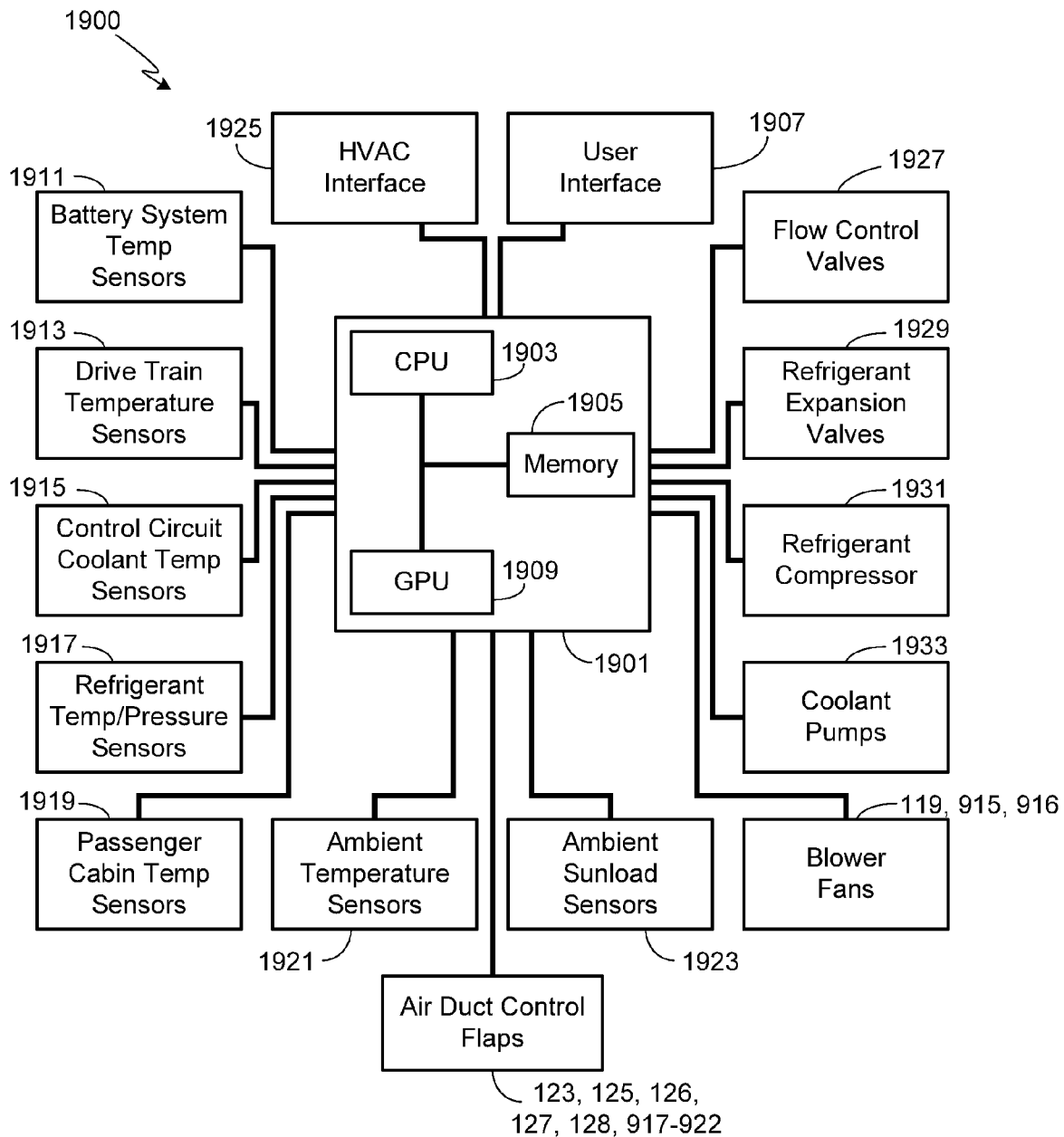
FIG. 19 provides a block diagram of an exemplary control system for use with a heat exchanger air flow control system such as those shown in FIGS. 1-18.

FIG. 19 is a block diagram of an exemplary control system 1900 for use with a thermal management system utilizing the heat exchanger system shown in anyone of FIGS. 1-18. Control system 1900 includes a system controller 1901. System controller 1901 may be the same controller used to perform other vehicle functions, e.g., system controller 1901 may be a vehicle system controller that may be used to control any of a variety of vehicle subsystems, e.g., navigation system, entertainment system, suspension (e.g., air suspension), battery charging, vehicle performance monitors, etc. Alternately, system controller 1901 may be separate from the vehicle's system controller. System controller 1901 includes a central processing unit (CPU) 1903 and a memory 1905. Memory 1905 may be comprised of EPROM, EEPROM, flash memory, RAM, a solid state disk drive, a hard disk drive, or any other memory type or combination of memory types. Memory 1905 may be used to store preset operating temperature ranges for the vehicle's battery pack, drive train, power system, etc. If the vehicle uses a touch-screen or similar display means 1907 as a user interface, controller 1901 may also include a graphical processing unit (GPU) 1909. CPU 1903 and GPU 1909 may be separate or contained on a single chip set.

Preferably coupled to controller 1901 are a variety of temperature sensors that monitor the temperatures of various components and subsystems under the control of the thermal control system, thereby allowing the system controller to determine optimal heat exchanger door flap settings. Exemplary temperature sensors may include one or more temperature sensors 1911 that monitor battery pack temperature; one or more temperature sensors 1913 that monitor the drive train; one or more temperature sensors 1915 that monitor the temperature of the heat transfer fluid within the thermal control loops including those thermal control loops utilizing the heat exchangers of the invention; one or more temperature sensors 1917 that monitor the state of the refrigerant in a thermal control loop utilizing a heat exchanger of the invention; one or more temperature sensors 1919 that monitor passenger cabin temperature; one or more temperature sensors 1921 that monitor ambient temperature; and one or more temperature sensors 1923 that monitor the sun load. Typically a HVAC system interface 1925 is also coupled to controller 1901 in order to allow the desired passenger cabin temperature to be set by the driver and/or passengers, where the desired temperature may be configured to either be set by zone or a single temperature for the entire cabin. HVAC system interface 1925 may be a HVAC dedicated interface, e.g., temperature control switches mounted within the passenger cabin, or may utilize a common user interface such as display interface 1907.

Also coupled to the thermal management system, and in particular controller 1901, are a variety of components that are used to maintain each of the vehicle's subsystems (e.g., battery pack, drive train components, passenger cabin, etc.) within their desired temperature range while optimizing overall system efficiency. Accordingly, coupled to and controlled by controller 1901 may be heat transfer flow control valves 1927; refrigerant expansion valves 1929; refrigeration system compressor 1931; heat transfer fluid circulating pumps 1933; blower fans 119, 915 and 916; and air duct control flaps 123, 125, 126, 127, 128 and 917-922.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A heat exchanger air flow control system, comprising:
   a first heat exchanger;
   a second heat exchanger configured in a non-stacked arrangement with said first heat exchanger;
   a third heat exchanger configured in a non-stacked arrangement with said first and second heat exchangers;
   a first air inlet corresponding to said first heat exchanger, wherein air flowing into said first air inlet passes directly into said first heat exchanger without passing through either said second or third heat exchangers;
   a second air inlet corresponding to said second heat exchanger, wherein air flowing into said second air inlet passes directly into said second heat exchanger without passing through either said first or third heat exchangers;
   a third air inlet corresponding to said third heat exchanger, wherein air flowing into said third air inlet passes directly into said third heat exchanger without passing through either said first or second heat exchangers;
   a first air duct, wherein said first air duct couples a first air outlet corresponding to said first heat exchanger to said second air inlet corresponding to said second heat exchanger;
   a second air duct, wherein said second air duct couples said first air outlet corresponding to said first heat exchanger to said third air inlet corresponding to said third heat exchanger;
   a third air duct, wherein said third air duct couples said first air outlet corresponding to said first heat exchanger to a second air outlet corresponding to said second heat exchanger;
   a fourth air duct, wherein said fourth air duct couples said first air outlet corresponding to said first heat exchanger to a third air outlet corresponding to said third heat exchanger;
   a first fan positioned adjacent to said second air outlet, wherein said first fan is configured to draw air through said second heat exchanger via a first pathway, wherein air following said first pathway passes through said second air inlet, said second heat exchanger, and through said second air outlet, wherein said first fan is configured to draw air through said second heat exchanger via a second pathway, wherein air following said second pathway passes through said first air inlet, said first heat exchanger, said first air duct, said second heat exchanger, and through said second air outlet, wherein said first fan is configured to draw air around said second heat exchanger and bypass said second heat exchanger via a third pathway, wherein air following said third pathway passes through said first air inlet, said first heat exchanger, said third air duct, and through said second air outlet; and
   a second fan positioned adjacent to said third air outlet, wherein said second fan is configured to draw air through said third heat exchanger via a fourth pathway, wherein air following said fourth pathway passes through said third air inlet, said third heat exchanger, and through said third air outlet, wherein said second fan is configured to draw air through said third heat exchanger via a fifth pathway, wherein air following said fifth pathway passes through said first air inlet, said first heat exchanger, said second air duct, said third heat exchanger, and through said third air outlet, wherein said second fan is configured to draw air around said third heat exchanger and bypass said third heat exchanger via a sixth pathway, wherein air following said sixth pathway passes through said first air inlet, said first heat exchanger, said fourth air duct, and through said third air outlet.

2. The heat exchanger air flow control system of claim 1, further comprising:
   a first air control surface, wherein said first air control surface is incorporated into said first air duct, wherein said first air control surface is adjustable between a first air control surface closed position and a first air control surface open position, wherein air flowing through said first heat exchanger flows through said first air duct and into said second heat exchanger via said second air inlet when said first air control surface is in said first air control surface open position, wherein air flow between said first air outlet and said second air inlet is terminated when said first air control surface is in said first air control surface closed position, and wherein said first air control surface is selected from the group consisting of flaps, vanes, air vanes, louvers and doors; and
   a second air control surface, wherein said second air control surface is incorporated into said second air duct, wherein said second air control surface is adjustable between a second air control surface closed position and a second air control surface open position, wherein air flowing through said first heat exchanger flows through said second air duct and into said third heat exchanger via said third air inlet when said second air control surface is in said second air control surface open position, wherein air flow between said first air outlet and said third air inlet is terminated when said second air control surface is in said second air control surface closed position, and wherein said second air control surface is selected from the group consisting of flaps, vanes, air vanes, louvers and doors.

3. The heat exchanger air flow control system of claim 2, wherein said first air control surface is adjustable within a first range of positions between and including said first air control surface closed position and said first air control surface open position, and wherein said second air control surface is adjustable within a second range of positions between and including said second air control surface closed position and said second air control surface open position.

4. The heat exchanger air flow control system of claim 2, further comprising:
   a third air control surface, wherein said third air control surface is incorporated into said third air duct, wherein said third air control surface is adjustable between a third air control surface closed position and a third air control surface open position, wherein air flowing through said first heat exchanger flows through said third air duct and through said second air outlet and bypasses said second heat exchanger when said third air control surface is in said third air control surface open position, wherein air flow between said first air outlet and said second air outlet is terminated when said third air control surface is in said third air control surface closed position, and wherein said third air control surface is selected from the group consisting of flaps, vanes, air vanes, louvers and doors; and a fourth air control surface, wherein said fourth air control surface is incorporated into said fourth air duct, wherein said fourth air control surface is adjustable between a fourth air control surface closed position and a fourth air control surface open position, wherein air flowing through said first heat exchanger flows through said fourth air duct and through said third air outlet and bypasses said third heat exchanger when said fourth air control surface is in said fourth air control surface open position, wherein air flow between said first air outlet and said third air outlet is terminated when said fourth air control surface is in said fourth air control surface closed position, and wherein said fourth air control surface is selected from the group consisting of flaps, vanes, air vanes, louvers and doors.

5. The heat exchanger air flow control system of claim 4, wherein said third air control surface is adjustable within a third range of positions between and including said third air control surface closed position and said third air control surface open position, and wherein said fourth air control surface is adjustable within a fourth range of positions between and including said fourth air control surface closed position and said fourth air control surface open position.

6. The heat exchanger air flow control system of claim 4, said third air duct coupled to said first air duct at a first juncture, said fourth air duct coupled to said second air duct at a second juncture, said third air control surface integrated into said first juncture, and said fourth air control surface integrated into said second juncture.

7. The heat exchanger air flow control system of claim 5, further comprising:
a fifth air control surface, wherein said fifth air control surface is integrated into said second air inlet, wherein said fifth air control surface is adjustable between a third air control surface closed position and a third air control surface open position, wherein when said fifth air control surface is in said fifth air control surface open position air is permitted to flow into said second heat exchanger via said second air inlet, wherein when said fifth air control surface is in said fifth air control surface closed position air is not permitted to flow into said second heat exchanger via said second air inlet, and wherein said fifth air control surface is selected from the group consisting of flaps, vanes, air vanes, louvers and doors; and
a sixth air control surface, wherein said sixth air control surface is integrated into said third air inlet, wherein said sixth air control surface is adjustable between a sixth air control surface closed position and a sixth air control surface open position, wherein when said sixth air control surface is in said sixth air control surface open position air is permitted to flow into said third heat exchanger via said third air inlet, wherein when said sixth air control surface is in said sixth air control surface closed position air is not permitted to flow into said third heat exchanger via said third air inlet, and wherein said sixth air control surface is selected from the group consisting of flaps, vanes, air vanes, louvers and doors.

8. The heat exchanger air flow control system of claim 4, wherein said fifth air control surface is adjustable within a fifth range of positions between and including said fifth air control surface closed position and said fifth air control surface open position, and wherein said sixth air control surface is adjustable within a sixth range of positions between and including said sixth air control surface closed position and said sixth air control surface open position.

9. The heat exchanger air flow control system of claim 1, said third air duct connected to said first air duct at a first juncture and interposed between said first air duct and said second air outlet, said fourth air duct coupled to said second air duct at a second juncture and interposed between said second air duct and said third air outlet.

10. The heat exchanger air flow control system of claim 9, further comprising:
a third air control surface integrated into said first juncture, wherein said third air control surface is adjustable between a third air control surface closed position and a third air control surface open position, wherein air flowing through said first heat exchanger flows through said third air duct and through said second air outlet and bypasses said second heat exchanger when said third air control surface is in said third air control surface open position, wherein air flow between said first air outlet and said second air outlet is terminated when said third air control surface is in said third air control surface closed position, and wherein said third air control surface is selected from the group consisting of flaps, vanes, air vanes, louvers and doors; and
a fourth air control surface integrated into said second juncture, wherein said fourth air control surface is adjustable between a fourth air control surface closed position and a fourth air control surface open position, wherein air flowing through said first heat exchanger flows through said fourth air duct and through said third air outlet and bypasses said third heat exchanger when said fourth air control surface is in said fourth air control surface open position, wherein air flow between said first air outlet and said third air outlet is terminated when said fourth air control surface is in said fourth air control surface closed position, and wherein said fourth air control surface is selected from the group consisting of flaps, vanes, air vanes, louvers and doors.

11. The heat exchanger air flow control system of claim 10, wherein said third air control surface is adjustable within a third range of positions between and including said third air control surface closed position and said third air control surface open position, and wherein said fourth air control surface is adjustable within a fourth range of positions between and including said fourth air control surface closed position and said fourth air control surface open position.

12. The heat exchanger air flow control system of claim 10, further comprising:
a fifth air control surface, wherein said fifth air control surface is integrated into said second air inlet, wherein said fifth air control surface is adjustable between a third air control surface closed position and a third air control surface open position, wherein when said fifth air control surface is in said fifth air control surface open position air is permitted to flow into said second heat exchanger via said second air inlet, wherein when said fifth air control surface is in said fifth air control surface closed position air is not permitted to flow into said second heat exchanger via said second air inlet, and wherein said fifth air control surface is selected from the group consisting of flaps, vanes, air vanes, louvers and doors; and a sixth air control surface, wherein said sixth air control surface is integrated into said third air inlet, wherein said sixth air control surface is adjustable between a sixth air control surface closed position and a sixth air control surface open position, wherein when said sixth air control surface is in said sixth air control surface open position air is permitted to flow into said third heat exchanger via said third air inlet, wherein when said sixth air control surface is in said sixth air control surface closed position air is not permitted to flow into said third heat exchanger via said third air inlet, and wherein said sixth air control surface is selected from the group consisting of flaps, vanes, air vanes, louvers and doors.

13. The heat exchanger air flow control system of claim 12, wherein said fifth air control surface is adjustable within a fifth range of positions between and including said fifth air control surface closed position and said fifth air control surface open position, and wherein said sixth air control surface is adjustable within a sixth range of positions between and including said sixth air control surface closed position and said sixth air control surface open position.

14. The heat exchanger air flow control system of claim 1, further comprising:
a fifth air control surface, wherein said fifth air control surface is integrated into said second air inlet, wherein said fifth air control surface is adjustable between a fifth air control surface closed position and a fifth air control surface open position, wherein when said fifth air control surface is in said fifth air control surface open position air is permitted to flow into said second heat exchanger via said second air inlet, wherein when said fifth air control surface is in said fifth air control surface closed position air is not permitted to flow into said second heat exchanger via said second air inlet, and wherein said fifth air control surface is selected from the group consisting of flaps, vanes, air vanes, louvers and doors; and a sixth air control surface, wherein said sixth air control surface is integrated into said third air inlet, wherein said sixth air control surface is adjustable between a sixth air control surface closed position and a sixth air control surface open position, wherein when said sixth air control surface is in said sixth air control surface open position air is permitted to flow into said third heat exchanger via said third air inlet, wherein when said sixth air control surface is in said sixth air control surface closed position air is not permitted to flow into said third heat exchanger via said third air inlet, and wherein said sixth air control surface is selected from the group consisting of flaps, vanes, air vanes, louvers and doors.

15. The heat exchanger air flow control system of claim 14, wherein said fifth air control surface is adjustable within a fifth range of positions between and including said fifth air control surface closed position and said fifth air control surface open position, and wherein said sixth air control surface is adjustable within a sixth range of positions between and including said sixth air control surface closed position and said sixth air control surface open position.

16. The heat exchanger air flow control system of claim 1, said first heat exchanger comprising a pair of side-by-side heat exchangers.

17. The heat exchanger air flow control system of claim 16, said first air inlet comprising a pair of side-by-side air inlets corresponding to said pair of side-by-side heat exchangers.

* * * * *